United States Patent
Jeong

(10) Patent No.: US 11,458,916 B2
(45) Date of Patent: Oct. 4, 2022

(54) SIDE PROTECTION DEVICE FOR VEHICLE

(71) Applicant: Kwang-Cheol Jeong, Goyang-si (KR)

(72) Inventor: Kwang-Cheol Jeong, Goyang-si (KR)

( * ) Notice: Subject to any disclaimer, the term of this patent is extended or adjusted under 35 U.S.C. 154(b) by 262 days.

(21) Appl. No.: 16/645,025

(22) PCT Filed: Sep. 8, 2017

(86) PCT No.: PCT/KR2017/009898
§ 371 (c)(1),
(2) Date: Mar. 6, 2020

(87) PCT Pub. No.: WO2019/050070
PCT Pub. Date: Mar. 14, 2019

(65) Prior Publication Data
US 2020/0262375 A1 Aug. 20, 2020

(51) Int. Cl.
*B60R 19/42* (2006.01)
*B60R 19/24* (2006.01)
*B60R 19/48* (2006.01)

(52) U.S. Cl.
CPC .............. *B60R 19/42* (2013.01); *B60R 19/24* (2013.01); *B60R 19/483* (2013.01)

(58) Field of Classification Search
CPC ..... B60R 19/42; B60R 19/445; B60R 19/446; B60R 13/04; B60R 13/043; B60R 19/24
USPC ................................................. 293/126, 128
See application file for complete search history.

(56) References Cited

U.S. PATENT DOCUMENTS

| | | | |
|---|---|---|---|
| 4,879,543 A | 11/1989 | Smith, Sr. | |
| 5,072,979 A * | 12/1991 | Swinton | B60J 11/06 293/128 |
| 5,333,923 A * | 8/1994 | Whitfield | B60R 13/04 293/128 |
| 6,971,693 B1 * | 12/2005 | Richardson | B60R 19/42 280/770 |
| 8,393,658 B2 * | 3/2013 | Malina | B60R 13/043 293/128 |
| 8,573,661 B1 * | 11/2013 | Moreno | B60R 13/04 293/128 |
| 9,662,964 B1 * | 5/2017 | Mirza | B60R 13/04 |

(Continued)

FOREIGN PATENT DOCUMENTS

| | | |
|---|---|---|
| JP | 2001-026219 A | 1/2001 |
| KR | 20-0171409 Y1 | 3/2000 |

(Continued)

OTHER PUBLICATIONS

International Search Report Corresponding to PCT/KR2017/009898 dated Feb. 27, 2018.

(Continued)

*Primary Examiner* — Gregory A Blankenship
(74) *Attorney, Agent, or Firm* — Finch & Maloney PLLC; Jay S. Franklin; Michael J. Bujold

(57) ABSTRACT

A side protection device fora vehicle according to an embodiment of the present invention may comprise: a main body housing detachably attached to a side of a vehicle; a guard unit rotatably installed in the main body housing, deployed along the full-length direction of the vehicle for protecting the side of the vehicle from an external physical impact; and a fixing unit installed in the main body housing for catching and fixing the main body housing from the side of the vehicle by a manual operation.

21 Claims, 8 Drawing Sheets

(56) References Cited

U.S. PATENT DOCUMENTS

| | | | | |
|---|---|---|---|---|
| 9,931,997 B1* | 4/2018 | Jones | ................ | B60R 13/04 |
| 9,937,884 B2* | 4/2018 | Dagrossa | ................ | B60J 11/06 |
| 10,029,627 B2* | 7/2018 | Ardrey | ................ | B60R 13/04 |
| 2003/0209914 A1* | 11/2003 | Cano | ................ | B60R 19/42 |
| | | | | 293/128 |
| 2007/0158963 A1* | 7/2007 | Debs | ................ | B60R 19/42 |
| | | | | 293/128 |
| 2007/0273167 A1* | 11/2007 | Alexander | ............ | B60R 19/42 |
| | | | | 293/126 |
| 2010/0140966 A1* | 6/2010 | Kimball | ................ | B60R 13/04 |
| | | | | 293/128 |
| 2013/0328333 A1* | 12/2013 | Jordan | ................ | B60R 13/04 |
| | | | | 293/128 |
| 2015/0123412 A1* | 5/2015 | Kim | ................ | B60R 13/043 |
| | | | | 293/128 |
| 2016/0347266 A1* | 12/2016 | Mathis | ................ | B60R 13/04 |
| 2020/0231108 A1* | 7/2020 | Santiago | ................ | B60R 19/42 |

FOREIGN PATENT DOCUMENTS

| | | |
|---|---|---|
| KR | 10-1251912 B1 | 4/2013 |
| KR | 10-2014-0125022 A | 10/2014 |
| KR | 10-1723409 B1 | 4/2017 |

OTHER PUBLICATIONS

Written Opinion Corresponding to PCT/KR2017/009898 dated Feb. 27, 2018.

* cited by examiner

SIDE PROTECTION DEVICE FOR VEHICLE

TECHNICAL FIELD

The present invention relates to a side protection device for a vehicle.

BACKGROUND ART

In general, a large building (apartment, mall, office building or the like) has a secured parking space by dividing a parking row so that multiple vehicles can be parked in a row. In the secured parking space, the vehicles may be parked to have a certain separation distance from each other to the left and right, respectively.

Here, after the vehicle is parked in the divided parking row, in case that a vehicle door is opened for a passenger to get out of the vehicle, the separation distance between parked vehicles is generally smaller than a swing radius of the vehicle door which is opened.

Therefore, there may frequently occur the following situations: where edges of left and right vehicle doors which are opened cause damage such as scratching or packing to sides of neighboring vehicles parked; on the contrary, where sides of the vehicle are damaged by the neighboring vehicles.

The prior art thus discloses a sponge-type impact absorbing pad having a predetermined size and attached to one end of the vehicle door to absorb an external impact.

However, the prior impact absorbing pad is to be attached to a surface of the vehicle, and thus has the following problems: it is troublesome to replace the pad; there is a risk of damage caused by dust or foreign material which is attached on the surface of the vehicle thereto when the pad is detached; and the pad is easily stolen.

DISCLOSURE

Technical Problem

An object of the present invention is to provide a side protection device for a vehicle which is easily and simply detachably attached, is held firmly in a fixed state, and minimizes damage caused by foreign material on a surface of the vehicle thereto when detached.

Another object of the present invention is to provide a side protection device for a vehicle, capable of being installed to fit side curvatures of various vehicles and models, and effectively protecting a large area of the vehicle from an external physical impact.

The objects of the present invention are not limited to those mentioned above, and other effects that are not mentioned are clearly understood by those skilled in the art from the following description.

Technical Solution

According to an embodiment of the present invention, there is provided side protection device for a vehicle including: a main body housing detachably attached to a side of the vehicle; a guard unit rotatably installed to the main body housing and deployed along a full-length direction of the vehicle for protecting the side of the vehicle from an external physical impact; and a fixing unit installed in the main body housing for locking and fixing the main body housing to the side of the vehicle by a manual operation.

In addition, the main body housing may include a magnetic pad allowing the main body housing to be detachably attached to the side of the vehicle by a magnetic force.

In addition, the guard unit may have a telescopic form so that a length of the guard unit is adjusted in one direction, and connected to hinges in multiple stages so that one end of the guard unit is folded.

In addition, the guard unit may further include a support member coupled to the guard unit, detachably attached to a surface of the vehicle by the magnetic force, and supporting the guard unit to be fixed to the surface of the vehicle.

In addition, the fixing unit may include a clamp and a fastening switch, the clamp being built in the main body housing and locked and fixed to the side of the vehicle, and the fastening switch allowing the clamp to be pulled out of/built in the main body housing by the manual operation.

In addition, the clamp may have a clip form.

Meanwhile, according to another embodiment of the present invention, there is provided a side protection device for a vehicle including: an adapter housing detachably attached to a vehicle door by a first magnetic force; a main body housing detachably attached to the adapter housing by a second magnetic force; a plurality of guard units rotatably coupled to the main body housing, having a length varied in one direction about a rotation axis, and protecting a surface of the vehicle from a physical impact; and a fixing unit provided in the adapter housing and fixing the adapter housing to the side of the vehicle.

In addition, the adapter housing may include a coupling groove and a column, the coupling groove being formed to be recessed in one surface of the adapter housing to guide the main body housing to be coupled to the adapter housing, and the column being formed to extend from one surface of the coupling groove and having a locking jaw extending radially at an end of the column and a bar magnet built in the column and providing the second magnetic force.

In addition, the main body housing may include a docking switch and a docking clamp, the docking switch being installed on the main body housing and driven by sensing the second magnetic force generated from the adapter housing, and the docking clamp being installed in the main body housing and driven depending on a drive of the docking switch to be locked and fixed to/unlocked from the adapter housing.

In addition, the main body housing may include a battery and a control unit, the battery being installed in the main body housing for supplying the docking switch with driving power, and the control unit being installed in the main body housing and remotely controlling the docking switch in case that a user operates a user terminal or a smart key of the vehicle.

In addition, the main body housing may further include a separation means installed on the main body housing for allowing the guard unit to be separated from the side of the vehicle by a predetermined distance.

In addition, the side protection device for a vehicle may further include a pedestrian detection sensor and a control unit, the pedestrian detection sensor being installed in the main body housing or the guard unit, and the control unit driving the separation means based on a detection signal from the pedestrian detection sensor.

In addition, the pedestrian detection sensor may include a proximity sensor or an impact detection sensor.

In addition, the main body housing may further include a rubber packing coupled to one surface of the main body housing facing the coupling groove in case that the main body housing and the adapter housing are coupled to each other.

In addition, the rubber packing may have an inclined surface among its circumferential surfaces, the inclined surface corresponding to an inclined surface among inner circumferential surfaces of the coupling groove.

In addition, the control unit may include a communication module and a control module, the communication module receiving a control signal from the user terminal or the smart key of the vehicle, and the control module controlling a drive of the docking switch based on the control signal received by the communication module.

In addition, the fixing unit may be a clamp locked and fixed to an edge of the vehicle door corresponding to the side of the vehicle in a clip form.

In addition, the clamp may include a detachment prevention pin bent from an end of the clamp and disposed between the edge of the vehicle door and an adjacent vehicle pillar when the vehicle door is closed for preventing the adapter housing from being detached from the side of the vehicle.

According to still another embodiment of the present invention, there is provided a side protection device for a vehicle including: a main body housing detachably attached to a side of the vehicle; a guard unit rotatably installed to the main body housing and deployed along a full-length direction of the vehicle for protecting the side of the vehicle from an external physical impact; a fixing clip built in a side of the main body housing and protruding from the main body housing to lock and fix the main body housing to the side of the vehicle; and an attachment button allowing the fixing clip to protrude and installed in the main body housing.

Here, at least two attachment buttons are formed on one surface of the main body housing.

Here, the fixing clip built in the main body housing may protrude in an arc shape by a button operation of the attachment button to be fixed to a frame edge of the vehicle.

Here, the side protection device for a vehicle may further include a clip guide portion formed on the main body housing.

Advantageous Effects

According to the present invention, by the magnetic pad and the fixing unit, the side protection device for a vehicle may be easily and simply detachably attached, be held firmly in a fixed state, and minimize damage caused by foreign material on a surface of the vehicle thereto when detached.

In addition, by the guard unit, the side protection device for a vehicle according to the present invention may be installed to fit side curvatures of various vehicles and models, and may effectively protect a large area of the vehicle from an external physical impact.

The effects of the present invention are not limited to those mentioned above, and other effects that are not mentioned are clearly understood by those skilled in the art from the following description.

BEST MODE

Figure 1:
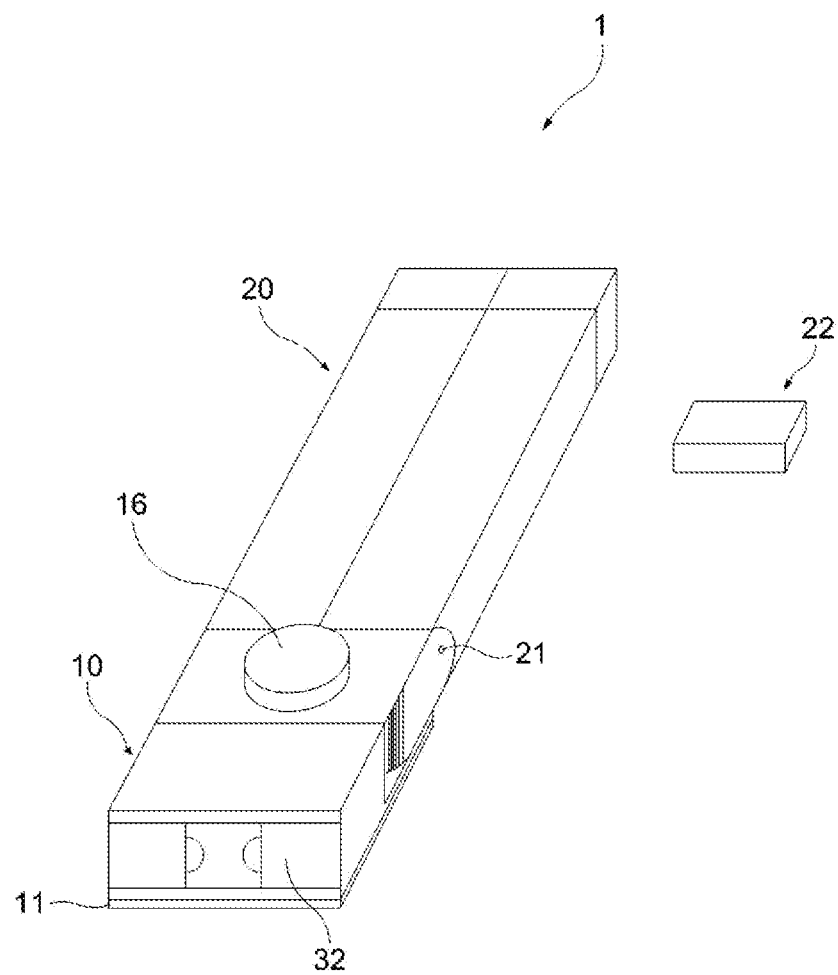
FIG. 1 is a first perspective view schematically showing an overall configuration of a side protection device for a vehicle according to a first embodiment of the present invention.

Hereinafter, embodiments of the present invention are described in detail with reference to the accompanying drawings. Various advantages and features of the present invention and methods accomplishing them become apparent from the following description of exemplary embodiments with reference to the accompanying drawings. However, the present invention is not limited to exemplary embodiments to be described below, but may be implemented in various different forms. These exemplary embodiments are provided only in order to make the present invention complete and allow those skilled in the art to completely recognize the scope of the present invention, and the present invention is defined by the scope of the claims. Throughout the specification, like reference numerals denote like elements.

Unless defined otherwise, all terms (including technical and scientific terms) used in the present specification have the same meaning as meanings commonly understood by those skilled in the art to which the present invention pertains. In addition, terms generally used and defined in a dictionary are not to be interpreted as having ideal or excessive meanings unless clearly indicated.

Hereinafter, a side protection device 1 for a vehicle according to embodiments of the present invention is described with reference to the drawings.

Figure 2:
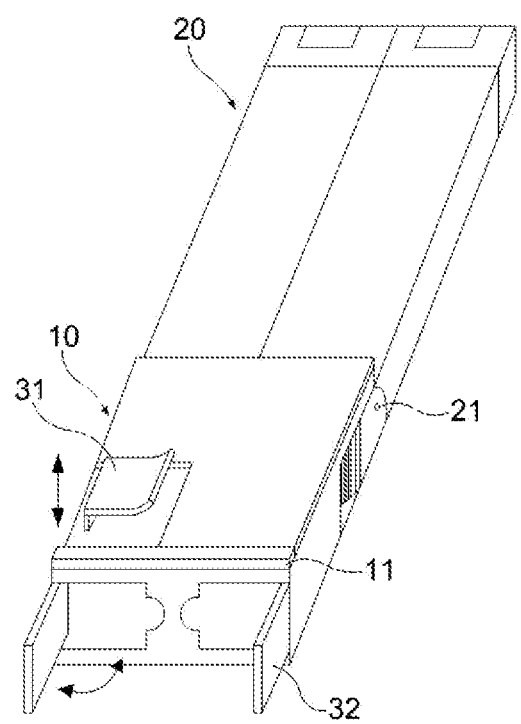
FIG. 2 is a second perspective view showing a state in which the side protection device for a vehicle according to the first embodiment shown in FIG. 1 is ready to be mounted on the vehicle.

FIG. 1 is a first perspective view schematically showing an overall configuration of a side protection device for a vehicle according to a first embodiment of the present invention; FIG. 2 is a second perspective view showing a state in which the side protection device for a vehicle according to the first embodiment shown in FIG. 1 is ready to be mounted on the vehicle; and FIG. 3 is a perspective view showing a deployed state of a guard unit according to the first embodiment shown in FIG. 1.

Figure 3:
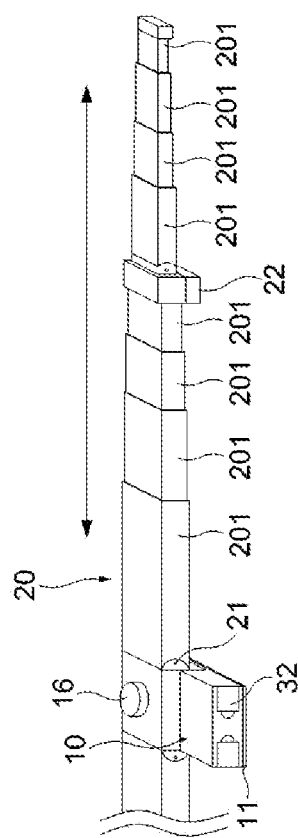
FIG. 3 is a perspective view showing a deployed state of a guard unit according to the first embodiment shown in FIG. 1.

Referring to FIGS. 1 to 3, a side protection device 1 for a vehicle according to an embodiment of the present invention, which may be easily and simply detachably attached, be held firmly in a fixed state, and minimize damage caused by foreign material on a surface of the vehicle thereto when detached, includes a main body housing 10, a guard unit 20 and a fixing unit 30.

Here, a side of a vehicle may refer to a side portion of the vehicle in which a door of the vehicle is disposed, and a pillar may refer to a pillar frame supporting a roof of the vehicle, as is well known. (For example, an A-pillar may refer to a frame disposed on a left/right side of a windshield glass on a front end of the vehicle, a B-pillar may refer to a frame disposed between front and rear seat doors of the vehicle, and a C-pillar may refer to a frame disposed on a left/right side of a glass on a rear end of the vehicle.

The main body housing 10 is configured to be detachably attached to the side of the vehicle. The main body housing 10 may include a magnetic pad 11 and thus be primarily detachably attached to the side of the vehicle by a magnetic force of the magnet pad 11. In addition, the main body housing 10 may further include an adhesive means enabling adhesion of the main body housing 10 to at least one side of the vehicle.

In addition, the main body housing 10 may further include a separation means 16 installed on the main body housing to allow the guard unit 20 to be spaced apart from the side of the vehicle by a predetermined distance.

The separation means 16 is configured to be able to adjust a position of the guard unit 20 to allow the guard unit 20 to be spaced apart from the side of the vehicle by the predetermined distance (i.e. to have an adjusted distance from a door portion). For example, the separation means 16 may be installed on the main body housing 10 to be connected to the guard unit 20 in a form of a shaft, and be implemented with a known drive means moving the guard unit 20 by the predetermined distance along an axial direction of the shaft. Here, the separation means 16 may be provided to be remotely controlled by a user's manual operation or a separate operation means.

The separation means 16 may be implemented using a spring structure or a lever structure. In addition, the separation means may be operated by a pedestrian detection sensor installed in the main body housing 10 or the guard unit 20. That is, based on a detection signal from the pedestrian detection sensor including a proximity sensor or an impact detection sensor, the separation means 16 may be configured to be driven by a control unit to axially move toward the door and thus not to obstruct movement of a pedestrian.

The magnetic pad 11 may be coupled to one surface of the main body housing 10, and may include, for example, a rubber magnet or a known magnet. It is preferable that the magnetic pad 11 includes a permanent magnet having a certain level or more of magnetism to allow the magnetic pad to be held firmly in a fixed state to the side of the vehicle.

In addition, one surface of the magnet pad 11, which is in contact with the surface of the vehicle, may be sealed with a soft material such as silicon to minimize damage caused by detachment of the side protection device for a vehicle from the side of the vehicle, i.e. the surface of the vehicle.

The guard unit 20 is configured to be installed to fit side curvatures of various vehicles and models, and serve to efficiently protect a large area of the vehicle from an external physical impact.

The guard unit 20 is configured to be installed rotatably by an axis of the main body housing 10. The guard unit 20 may be deployed to extend/expand along a full-length direction of the vehicle for protecting the side of the vehicle from the external physical impact.

The guard unit 20 may have a telescopic form (i.e. a form in which the guard unit 20 connected to a plurality of continuous frames 201 as shown in the drawings) so that a length of the guard unit 20 is adjusted in one direction. In addition, the guard unit 20 may have not only a style in which the guard unit 20 is deployed in both directions, but also a style in which the guard unit 20 is deployed in an inclined direction. The guard unit 20 may also be configured to have a style in which the guard unit 20 is deployed simultaneously in both the directions and the inclined direction. This configuration is described below with reference to FIG. 4.

Here, the guard unit 20 is configured to be connected to the plurality of frames 201 in multiple stages so that one end of the guard unit 20 is folded, and the plurality of frames 201 are connected to each other by hinges 202, respectively. Accordingly, the side protection device for a vehicle may systematically fold the guard unit 20 to fit the side curvatures of various vehicles, and as a result, may be easily installed to fit the curvatures of the various vehicles. That is, the hinges may be configured to be perpendicularly connected to each other in the axial direction and thus be rotated in X, Y or Z axis direction. This configuration is described in more detail with reference to FIG. 13.

In addition, the guard unit 20 may further include a support member 22 coupled to one surface of the guard unit 20, detachably attached to the surface of the vehicle by the magnetic force, and supporting the guard unit to be fixed to the surface of the vehicle. Accordingly, an overall weight of a guard member protecting the side of the vehicle may be distributed by the support member 22, thereby improving durability and enabling efficient impact dispersion even against external impact.

The fixing unit 30 is configured to serve to allow the main body housing 10 to be easily and simply detachably attached to the side of the vehicle while allowing the main body housing 10 to be held firmly in a fixed state to the side of the vehicle.

The fixing unit 30 is configured to be installed in the main body housing 10 for locking and fixing the main body housing 10 to the side of the vehicle by a manual operation. To this end, the fixing unit 30 may include a clamp 31 and a fastening switch 32.

The clamp 31 may be built in the main body housing 10 and locked and fixed to the side of the vehicle. That is, the clamp 31 is configured to be locked and fixed to the side of the vehicle, i.e. an edge of a vehicle door. The clamp 31 may have a clip form. That is, the clamp 31 is configured to be built in or protrude from the main body housing 10 based on an operation of the fastening switch 32 to be described below.

Based on the opening and closing operation of the fastening switch 32, the clamp 31 may be pulled out of/built in the main body housing 10. That is, when the fastening switch 32 is rotated from the main body housing 10, the clamp 31 may be configured to be interlocked with the fastening switch 32 and protrude outward from the main body housing 10. Therefore, the clamp 31 may press the edge of the vehicle door by such a systematic drive between the fastening switch 32 and the clamp 31. As a result, the main body housing 10 may be held more tightly in a locked and fixed state to the side of the vehicle.

Hereinafter, the description focuses on usages of the side protection device for a vehicle according to the embodiment of the present invention, which is configured as described above.

Figure 4:
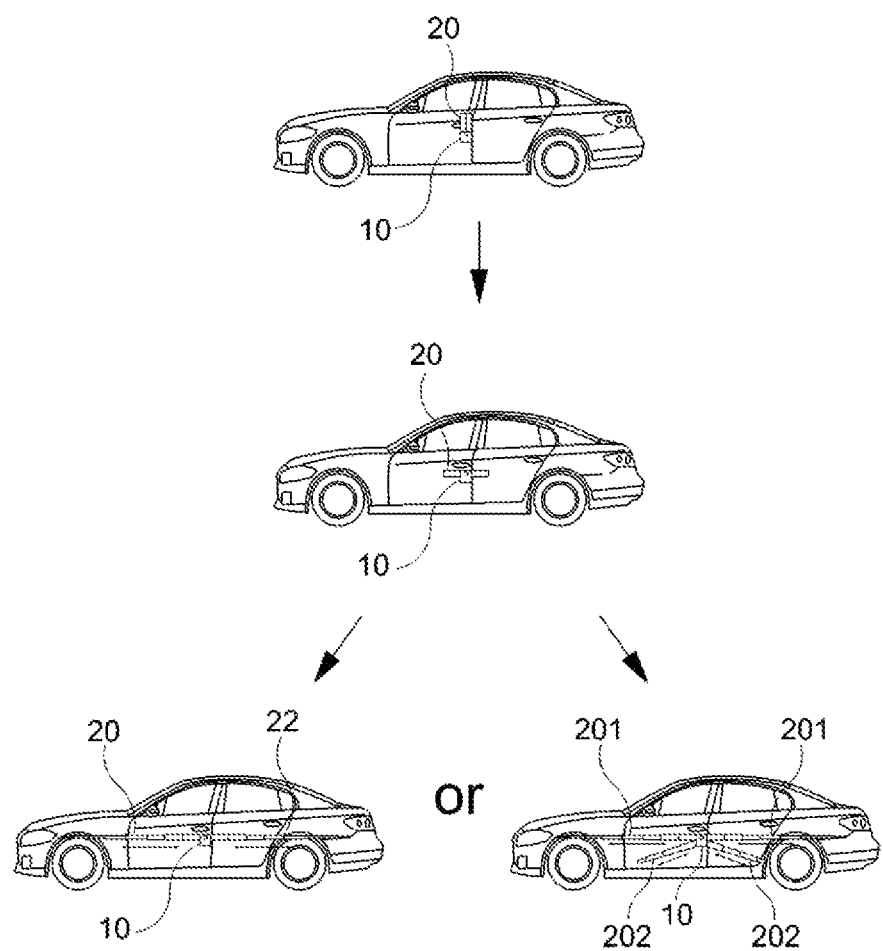
FIG. 4 is an exemplary view showing usages of the side protection device for a vehicle according to the first embodiment shown in FIG. 1.
Figure 5:
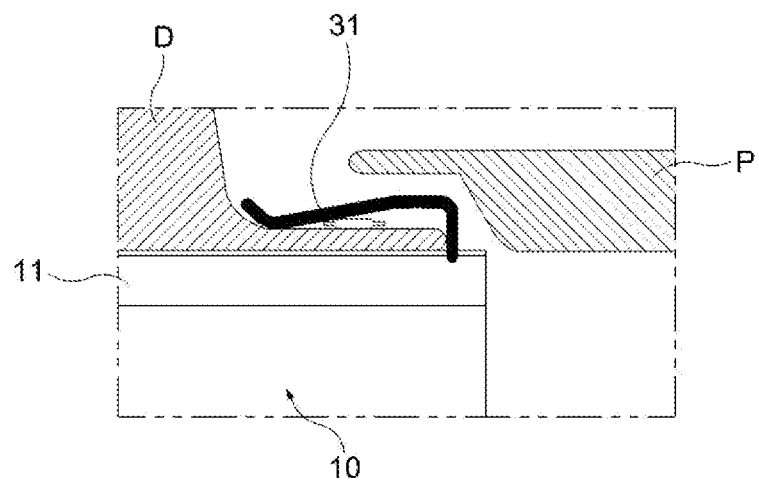
FIG. 5 is a view for explaining a state in which the side protection device for a vehicle according to the first embodiment shown in FIG. 1 is coupled to a side of the vehicle.

FIG. 4 is an exemplary view showing usages of the side protection device for a vehicle according to the first embodiment shown in FIG. 1; and FIG. 5 is a view for explaining a state in which the side protection device for a vehicle according to the first embodiment shown in FIG. 1 is coupled to a side of the vehicle.

Referring to FIGS. 4 and 5, when the vehicle is parked, the side protection device 1 for a vehicle of the present invention may attach the main body housing 10 to the side of the vehicle, i.e. a vehicle door adjacent to a vehicle pillar. Then, the guard unit 20 attached to the main body housing 10 may be deployed in both directions, and then deployed in a telescoping manner to be completely mounted on the side of the vehicle. Here, the guard unit 20 may include a horizontal guard unit 201 and an inclined guard unit 202. Alternatively, the guard unit 20 may include only either the horizontal guard unit 201 or the inclined guard unit 202. In case that the guard unit 20 includes both the horizontal guard unit 201 and the inclined guard unit 202, the side of the vehicle may be protected even when the vehicle has an unusual shape (for example, a protruding fender portion).

Meanwhile, the description describes that the side protection device 1 is coupled to a side of the door with reference to FIG. 5. As shown in FIG. 5, the main body housing 10 may include the magnetic pad 11, and be attached to and thus primarily fixed to the side of the vehicle by the magnetic force of the magnetic pad 11.

Next, when a user manually operates the fastening switch 32 of the fixing unit 30, the clamp 31 built in the main body housing 10 may be interlocked with the fastening switch 32 and pulled out of the main body housing 10, based on the operation of the fastening switch 32.

In addition, while the vehicle door is opened, the main body housing 10 may be secondly fixed to the side of the vehicle by clipping and fixing the pulled-out clamp 31 to the edge of the vehicle door D.

That is, the clamp 31 having the clip form may be clipped and fixed to the end of the vehicle door D.

Here, in case that the fastening switch 32 is manually operated, as the clamp 31 is fixed while pressing the end of the vehicle door D by a pull-out/built-in operation of the clamp 31, the main body housing 10 may be held more tightly and firmly in a fixed state to a side panel P of the vehicle.

Hereinafter, the description focuses on a side protection device for a vehicle according to a second embodiment of the present invention. Unlike in the first embodiment, the side protection device for a vehicle in the second embodiment may be automatically attached to the vehicle using an adapter housing attached to the vehicle.

Figure 6:
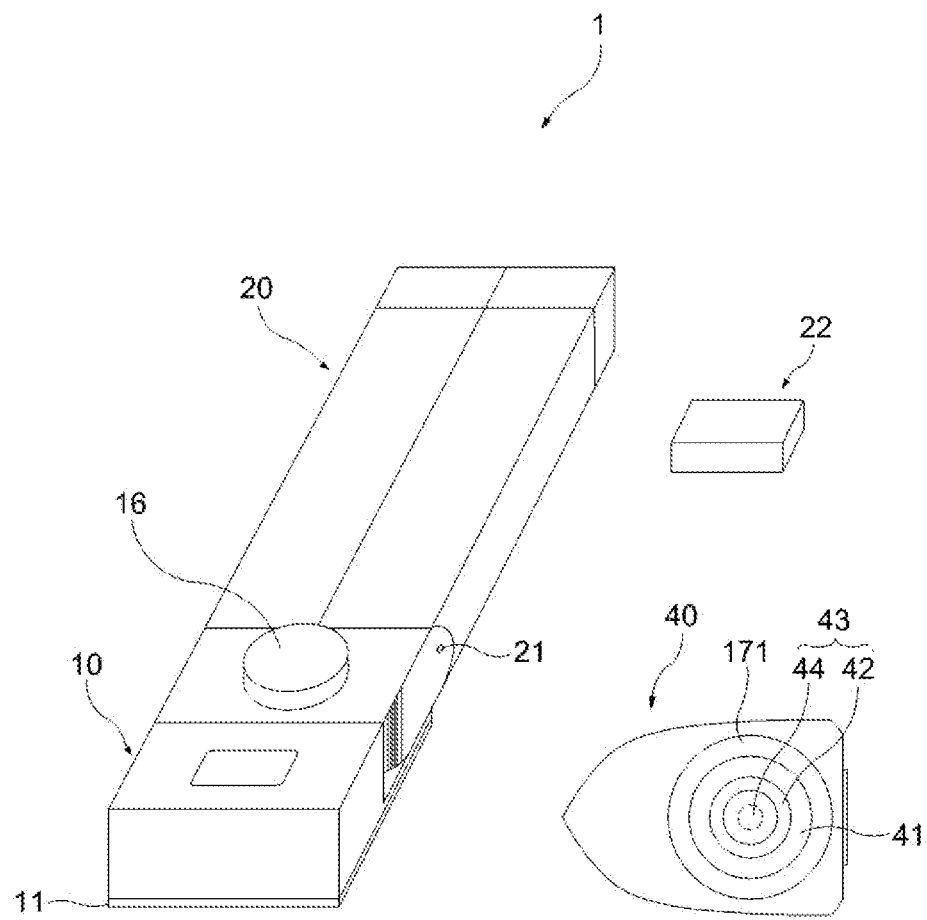
FIG. 6 is a perspective view schematically showing an overall configuration of a side protection device for a vehicle according to a second embodiment of the present invention.
Figure 7:
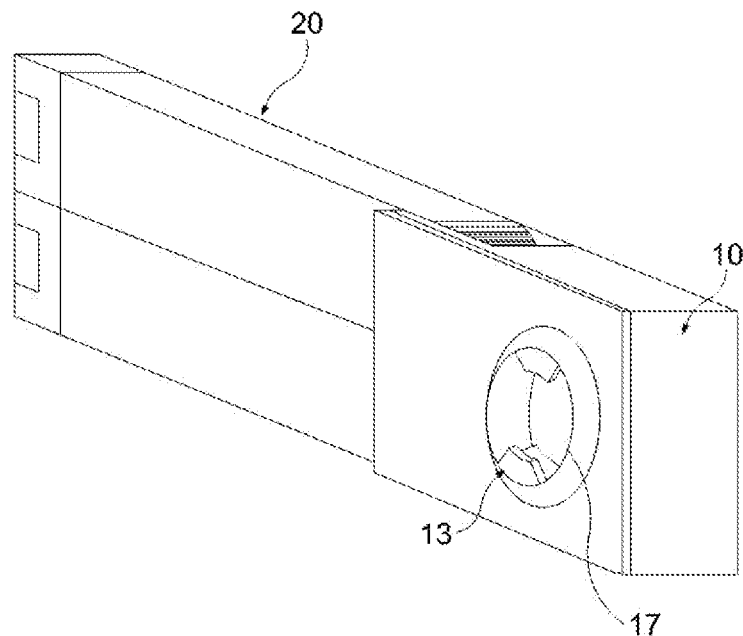
FIG. 7 is a perspective view showing a main body housing according to the second embodiment shown in FIG. 6.
Figure 8:
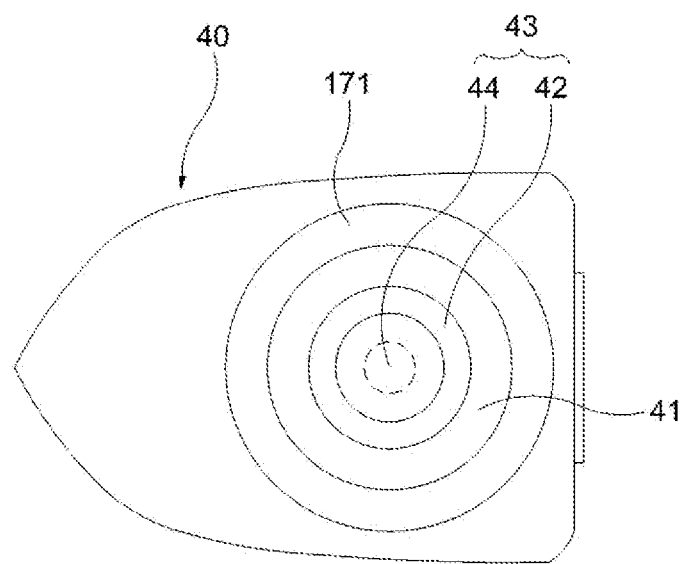
FIG. 8 is a plan view showing an adapter housing according to the second embodiment shown in FIG. 6.
Figure 9:
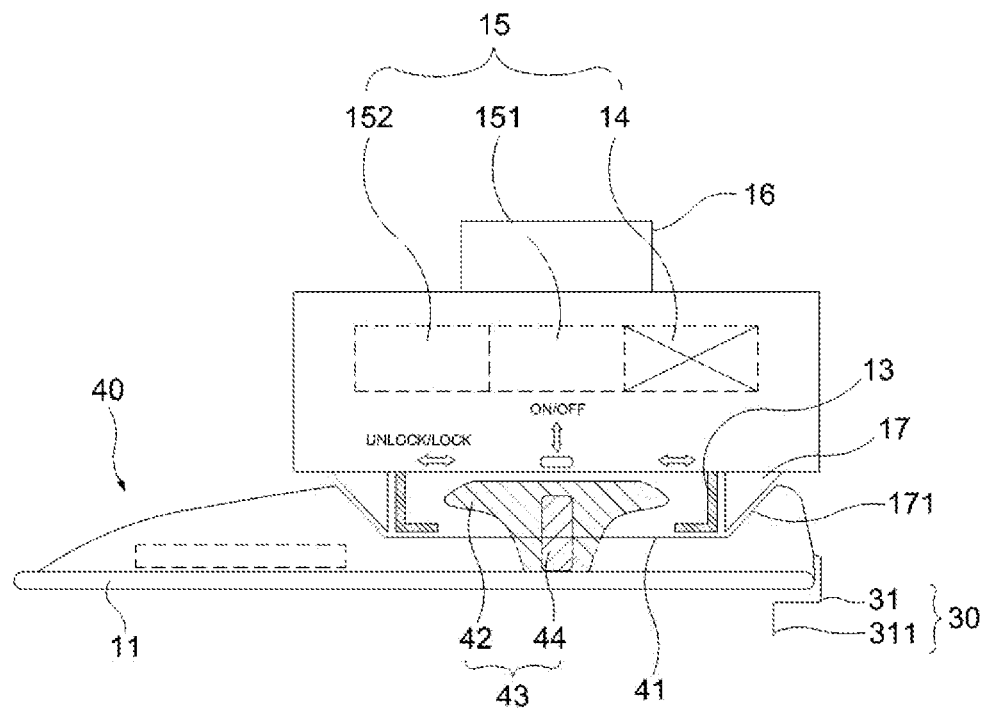
FIG. 9 is a side cross-sectional view showing a state in which the main body housing and the adapter housing, according to the second embodiment shown in FIG. 6, are detachably attached to each other.
Figure 10:
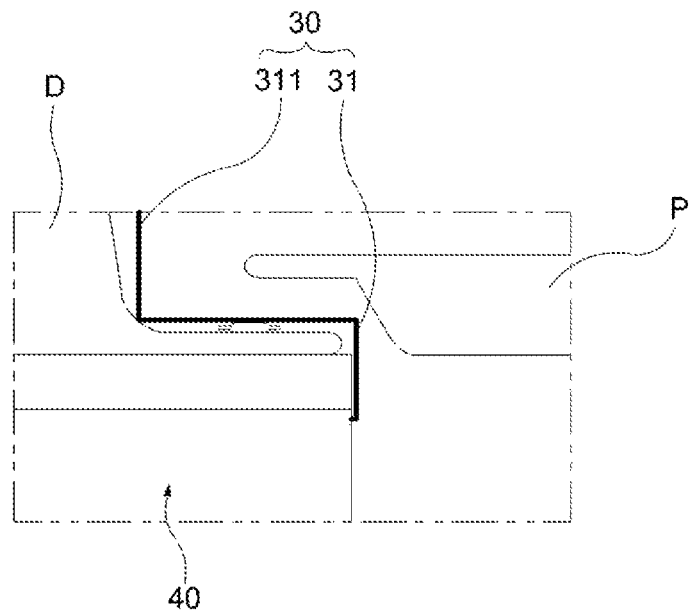
FIG. 10 is a view for explaining a state in which the side protection device for a vehicle according to the second embodiment shown in FIG. 6 is coupled to a side of the vehicle.

FIG. 6 is a perspective view schematically showing an overall configuration of a side protection device for a vehicle according to a second embodiment of the present invention; FIG. 7 is a perspective view showing a main body housing according to the second embodiment shown in FIG. 6; FIG. 8 is a plan view showing an adapter housing according to the second embodiment shown in FIG. 6; FIG. 9 is a side cross-sectional view showing a state in which the main body housing and the adapter housing, according to the second embodiment shown in FIG. 6, are detachably attached to each other; and FIG. 10 is a view for explaining a state in which the side protection device for a vehicle according to the second embodiment shown in FIG. 6 is coupled to a side of the vehicle.

Hereinafter, the second embodiment is described in detail, and the same components as those of the first embodiment are omitted for simple description of the invention.

Referring to FIGS. 6 to 10, the side protection device 10 for a vehicle according to another embodiment of the present invention may include an adapter housing 40, a main body housing 10, a guard unit 20 and a fixing unit 30.

The adapter housing 40 may be detachably attached to a vehicle door. The adapter housing 40 may include a magnet pad 11 on one surface thereof, and thus be detachably attached to the vehicle door, i.e. the side of the vehicle by a first magnetic force generated from the magnet pad 11. The adapter housing 40 may include a coupling groove 41 and a column 43.

The coupling groove 41 may be formed to be recessed in one end of the adapter housing 40 to guide the main body housing 10 to be detachably attached to the adapter housing 40.

The column 43 may be formed to protrude from the coupling groove 41 in a column form, and extend from one surface of the coupling groove 41. The column 43 may include a locking jaw 42 and a bar magnet 44.

The locking jaw 42 may be formed to extend radially at an end of the column 43.

The bar magnet 44 may serve to provide a second magnetic force, and may preferably be a permanent magnet such as neodymium.

The main body housing 10 is configured to be detachably attached to the adapter housing 40 by the second magnetic force. The main body housing 10 may include a docking switch 12 and a clamp groove 13.

The docking switch 12 is configured to be installed to the main body housing 10 and driven by sensing the second magnetic force generated from the adapter housing 40.

The clamp groove 13 may be installed to the main body housing 10 and physically driven depending on a drive of the docking switch 12 to be locked and fixed to/unlocked from the adapter housing 40. For example, the clamp groove 13 is configured to be formed in a ring shape an end of which is locked to the locking jaw 42 of the column 43, locked and fixed to/unlocked from the locking jaw 42 by sensing the second magnetic force of the main body housing 10, and driven typically by an actuator providing a physical drive force.

In addition, the main body housing 10 may include a battery 14 and a control unit 15.

The battery 14 may supply the docking switch 12 with driving power, and may be formed of, for example, a rechargeable secondary battery.

The control unit 15 may be configured to be installed in the main body housing 10 and remotely controlling the docking switch 12 in case that a user operates a user terminal such as a smart-phone or a smart key of the vehicle. The control unit 15 may be configured to include a communication module 151 receiving a control signal from the user terminal or the smart key of the vehicle and a control module 152 controlling a drive of the docking switch 12 based on the control signal received by the communication module 151. Here, a signal for remotely controlling the docking switch 12 may be transmitted by a separate short-range communication module as well as the user terminal, or a fingerprint sensor formed in the main body housing.

In addition, the main body housing 10 may further include a separation means 16. The separation means 16 is configured to be installed on the main body housing 10 for allowing the guard unit 20 to be separated from the side of the vehicle by a predetermined distance. The separation means 16 may be implemented by a known actuator connected to the guard unit 20 for physically moving the guard unit 20.

In addition, the main body housing 10 may further include a rubber packing 17.

The rubber packing 17 may be coupled to one surface of the main body housing 10 facing the coupling groove 41 in case that the main body housing 10 and the adapter housing 40 are coupled to each other. The rubber packing 17 may preferably be made of an elastic material having elasticity such as rubber material or silicone. The rubber packing 17 may be formed to have an inclined surface 171. The inclined surface 171 among circumferential surfaces of the rubber packing 17 may correspond to an inclined surface among inner circumferential surfaces of the coupling groove 41.

A plurality of guard units 20 are configured to be rotatably coupled to the main body housing 10, having a length varied in one direction about a rotation axis, and protecting a surface of the vehicle from a physical impact.

The fixing unit 30 may be configured to be provided in the adapter housing 40 and serve to fix the adapter housing 40 to the side of the vehicle.

The fixing unit 30 may be a clamp 31 locked and fixed to an edge of the vehicle door corresponding to the side of the vehicle in a clip form.

In addition, the clamp 31 may include a detachment prevention pin 311 bent from an end of the clamp 31 and disposed between the edge of the vehicle door and an adjacent vehicle pillar when the vehicle door is closed for preventing the adapter housing 40 from being detached from the side of the vehicle.

The description specifically describes a usage example of the side protection device 1 for a vehicle according to another embodiment of the present invention, which is configured as described above.

After parking the vehicle, the side protection device 1 for a vehicle according to another embodiment of the present invention may detachably attach the adapter housing 40 to the side of the vehicle, i.e. the vehicle door by a first magnetic force generated from the magnetic pad 11. Therefore, the adapter housing 40 may be primarily fixed to the vehicle door by the first magnetic force.

Then, the clamp 31 of the fixing unit 30 may be fixed to the edge of the vehicle door, i.e. the end of the door in contact with the pillar of the vehicle, and thus the adapter housing 40 may be secondarily fixed to the vehicle door.

Here, when the vehicle door is closed, the detachment prevention pin 311 may be disposed between the vehicle door and the vehicle pillar, and thus the adapter housing 40 may not be detached but be held firmly in a fixed state when the vehicle door is closed.

Therefore, the adapter housing 40 may be prevented not only from being forcibly detached by an external impact, but also from being stolen.

Next, the adapter housing 40 may be coupled to the main body housing 10 through the coupling groove 41 of the adapter housing 40.

In detail, the clamp groove 13 of the main body housing 10 may be inserted into the coupling groove 41 of the adapter housing 40. In this process, when the main body housing 10 and the adapter housing 40 come close to each other by a predetermined distance, the docking switch 12 of the adapter housing 40 may sense the second magnetic force generated from the bar magnet 44 built in the column 43.

Then, the docking switch 12 may drive the clamp groove 13 based on the sensed second magnetic force, and then the clamp groove 13 may be physically driven to be locked and fixed to the locking jaw 42 of the column 43.

Here, the main body housing 10 may be tightly coupled to the adapter housing 40 by the rubber packing 17, and simply and quickly coupled to the adapter housing 40 because the inclined surface 171 guides a coupling position of the main body housing 10 and the adapter housing 40.

In addition, the drive of the docking switch 12 for the coupling of the main body housing 10 and the adapter housing 40 may be remotely controlled by the control unit 15. For example, the above driving may be controlled based on a control of the control module 152 depending on a network communication between an application activated on the user's smart-phone and the communication module 151. The operation of the switch module 12 or the guard unit 20 may be controlled, being interlocked with various signals based on a driving of the vehicle (for example, vehicle start on/off).

Therefore, it is not only possible to easily and automatically couple and fasten the main body housing and the adapter housing 40 to each other, but also possible to simply and quickly control this coupling and fastening.

Next, the guard unit 20 may be rotated about the main body housing 10 in a state where the main body housing 10 is coupled to the adapter housing 40.

For example, the guard unit 20 may be installed rotatably by a rotation axis with respect to the main body housing 10, and thus the guard unit 20 may be rotated along the axial direction of the rotation axis.

In addition, the guard unit 20 may be deployed to extend/be reduced along a full-length direction of the vehicle in a telescoping manner.

The guard unit 20 may then protect the side of the vehicle from an external physical impact.

Here, the guard unit 20 may protect the sides of the various vehicles by being folded to fit a side curvature of the vehicle by hinges 21 connected to the guard unit 20.

In addition, a support member 22 may be coupled between the guard unit 20 and the side of the vehicle to support the guard unit 20, thereby distributing a weight of the guard unit 20 and improving durability of the guard unit 20 against the external impact.

Hereinafter, a side protection device for a vehicle according to a third embodiment of the present invention, which may be more conveniently attached to a door surface of a vehicle, is described in more detail with reference to FIGS. 11 and 12.

Figure 11:
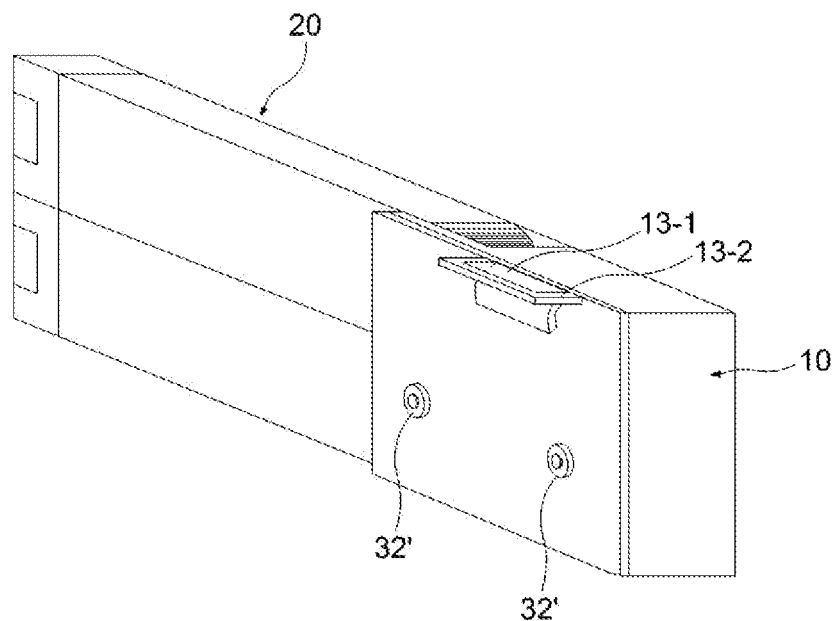
FIG. 11 is a perspective view schematically showing an overall configuration of a side protection device for a vehicle according to a third embodiment of the present invention.

FIG. 11 is a perspective view schematically showing an overall configuration of a side protection device for a vehicle according to a third embodiment of the present invention. The side protection device for a vehicle according to the third embodiment shown in FIG. 11 is different from those according to the first embodiment and the second embodiment in having components such as an attachment button 32' and a fixing clip 13-1. As shown in the drawing, a clip guide portion 13-2 may be formed at a side of a main body housing 10 detachably attached to a side of a vehicle. In a state where mounting of the fixing clip 13-1 is guided by the clip guide portion 13-2, the fixing clip 13-1 may be formed to protrude in an arc shape based on an input signal of the attachment button 32' and thus function to be locked and fixed to the door of the vehicle. Here, the attachment button 32' may be formed on a bottom surface of the main body housing 10.

As shown in the drawing, the clip guide portion 13-2 may have a c shape having an opening for the fixing clip 13-1.

The clip guide portion 13-2 is not limited to having this shape, and may be configured to have various shapes such as a shape in which the clip guide portions 13-2 protrude from both sides of the fixing clip 13-1.

As the side protection device for a vehicle according to the third embodiment is attached to an edge of a vehicle door, the attachment button 32' may be naturally pressed. Accordingly, the fixing clip 13-1 built in the main body housing 10 may be fixed to the edge of the vehicle door while being rotated in the arc shape in a state where the mounting of the fixing clip 13-1 is guided by the clip guide portion 13-2. Here, a built-in metal detection sensor (not shown) may be used together. That is, the metal detection sensor may check whether the side protection device for a vehicle is tightly attached to the vehicle door which is made of metal. In addition to this metal detection signal, when a pressing signal of the attachment button 32' is generated together, a built-in motor (not shown) may start its operation, and thus the fixing clip 13-1 may protrude. Here, two or more attachment buttons 32' may be formed on the bottom surface of the main body housing 10, and the fixing clip 13-1 may be configured to protrude when pressing signals are generated from both of these buttons 32'.

Hereinafter, a rotational operation of the guard unit 20 is described with reference to FIG. 12.

Figure 12:
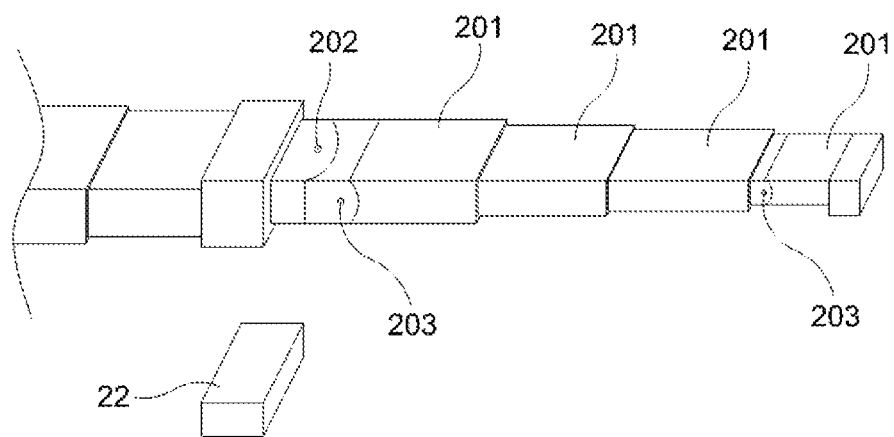
FIG. 12 is a view showing another example of the guard unit which may be applied to the side protection device for a vehicle according to the first to third embodiments of the present invention.

FIG. 12 is a view showing another example of the guard unit 20 which may be applied to the side protection device for a vehicle according to the first to third embodiments of the present invention. When rotated in the main body housing 10 and deployed horizontally, the guard unit 20 may need to be rotated in one of three axis directions due to a shape of the vehicle or various other reasons. In this case, as illustrated in FIG. 12, hinge shafts 202 and 203 may be installed between frames 201. The hinge shafts 202 and 203 may be installed continuously, and may be perpendicular to each other, respectively. When configured in this manner, the hinge shafts 202 and 203 may be rotated in all three X, Y, and Z axis directions.

As set forth above, the present invention may be easily and simply detachably attached, be held firmly in the fixed state, and minimize damage caused by foreign material on the surface of the vehicle thereto when detached. In addition, the present invention may be installed to fit the side curvatures of various vehicles and models, and may effectively protect a large area of the vehicle from the external physical impact.

Although exemplary embodiments of the present invention are described with reference to the accompanying drawings, those skilled in the art are expected to appreciate that various modifications and alterations may be made without departing from the spirit or essential feature of the present invention. Therefore, it is to be understood that exemplary embodiments described hereinabove are illustrative rather than being restrictive in all aspects.

The invention claimed is:

1. A side protection device for a vehicle, comprising:
   a main body housing detachably attached to a side of the vehicle;
   a guard unit rotatably installed to the main body housing and deployed along a full-length direction of the vehicle for protecting the side of the vehicle from an external physical impact;
   a fixing unit installed in the main body housing for locking and fixing the main body housing to the side of the vehicle by a manual operation, and
   the main body housing having a separation means installed on the main body housing for allowing the guard unit to be separated from the side of the vehicle by a predetermined distance.

2. The side protection device for a vehicle of claim 1, wherein the main body housing includes a magnetic pad allowing the main body housing to be detachably attached to the side of the vehicle by a magnetic force.

3. The side protection device for a vehicle of claim 1, wherein the guard unit has a telescopic form so that a length of the guard unit is adjusted in one direction, and extends by at least two hinges continuously connected to each other so that one end of the guard unit is folded.

4. The side protection device for a vehicle of claim 1, wherein the guard unit further includes a support member coupled to the guard unit, detachably attached to a surface of the vehicle by the magnetic force, and supporting the guard unit to be fixed to the surface of the vehicle.

5. A side protection device for a vehicle, comprising:
   a main body housing detachably attached to a side of the vehicle;
   a guard unit rotatably installed to the main body housing and deployed along a full-length direction of the vehicle for protecting the side of the vehicle from an external physical impact;
   a fixing unit installed in the main body housing for locking and fixing the main body housing to the side of the vehicle by a manual operation;
   wherein the fixing unit includes a clamp and a fastening switch,
   the clamp being built in the main body housing and locked and fixed to the side of the vehicle, and
   the fastening switch allowing the clamp to be pulled out of/built in the main body housing by the manual operation.

6. The side protection device for a vehicle of claim 5, wherein the clamp has a clip form.

7. A side protection device for a vehicle, comprising:
   an adapter housing detachably attached to a vehicle door by a first magnetic force;
   a main body housing detachably attached to the adapter housing by a second magnetic force;
   a plurality of guard units rotatably coupled to the main body housing, having a length varied in one direction about a rotation axis, and protecting a surface of the vehicle from a physical impact; and
   a fixing unit provided in the adapter housing and fixing the adapter housing to a side of the vehicle.

8. The side protection device for a vehicle of claim 7, wherein the adapter housing includes a coupling groove and a column,
   the coupling groove being formed to be recessed in one surface of the adapter housing to guide the main body housing to be coupled to the adapter housing, and
   the column being formed to extend from one surface of the coupling groove and having a locking jaw extending radially at an end of the column and a bar magnet built in the column and providing the second magnetic force.

9. The side protection device for a vehicle of claim 7, wherein the main body housing includes a docking switch and a clamp groove,
   the docking switch being installed on the main body housing and driven by sensing the second magnetic force generated from the adapter housing, and
   the clamp groove being installed in the main body housing and driven depending on a drive of the docking switch to be locked and fixed to/unlocked from the adapter housing.

10. The side protection device for a vehicle of claim 9, wherein the main body housing includes a battery and a control unit, the battery being installed in the main body housing for supplying the docking switch with driving power, and the control unit being installed in the main body housing and remotely controlling the docking switch in case that a user operates a user terminal or a smart key of the vehicle.

11. The side protection device for a vehicle of claim 7, wherein the main body housing further includes a rubber packing coupled to one surface of the main body housing facing the coupling groove in case that the main body housing and the adapter housing are coupled to each other.

12. The side protection device for a vehicle of claim 11, wherein the rubber packing has an inclined surface among its circumferential surfaces, the inclined surface corresponding to an inclined surface among inner circumferential surfaces of the coupling groove.

13. The side protection device for a vehicle of claim 10, wherein the control unit includes a communication module and a control module, the communication module receiving a control signal from the user terminal or the smart key of the vehicle, and the control module controlling a drive of the docking switch based on the control signal received by the communication module.

14. The side protection device for a vehicle of claim 7, wherein the fixing unit is a clamp locked and fixed to an edge of the vehicle door corresponding to the side of the vehicle in a clip form.

15. The side protection device for a vehicle of claim 14, wherein the clamp includes a detachment prevention pin bent from an end of the clamp and disposed between the edge of the vehicle door and an adjacent vehicle pillar when the vehicle door is closed for preventing the adapter housing from being detached from the side of the vehicle.

16. The side protection device for a vehicle of claim 1, wherein the side protection device for a vehicle further includes a pedestrian detection sensor and a control unit, the pedestrian detection sensor being installed in the main body housing or the guard unit, and the control unit driving the separation means based on a detection signal from the pedestrian detection sensor.

17. The side protection device for a vehicle of claim 16, wherein the pedestrian detection sensor includes a proximity sensor or an impact detection sensor.

18. A side protection device for a vehicle, comprising:

a main body housing detachably attached to a side of the vehicle;

a guard unit rotatably installed to the main body housing, deployed along a full-length direction of the vehicle for protecting the side of the vehicle from an external physical impact;

a fixing clip built in a side of the main body housing and protruding from the main body housing to lock and fix the main body housing to the side of the vehicle; and an attachment button allowing the fixing clip to protrude and installed in the main body housing.

19. The side protection device for a vehicle of claim 18, wherein at least two attachment buttons are formed on one surface of the main body housing.

20. The side protection device for a vehicle of claim 18, wherein the fixing clip built in the main body housing protrudes in an arc shape by a button operation of the attachment button to be fixed to a frame edge of the vehicle.

21. The side protection device for a vehicle of claim 18, wherein the side protection device for a vehicle further includes a clip guide portion formed on the main body housing.

* * * * *